(12) United States Patent
Pollard, Jr.

(10) Patent No.: US 8,757,558 B2
(45) Date of Patent: Jun. 24, 2014

(54) CABLE TRAY

(75) Inventor: Michael Ernest Pollard, Jr., Greenville, SC (US)

(73) Assignee: MP Husky, LLC, Greenville, SC (US)

( * ) Notice: Subject to any disclaimer, the term of this patent is extended or adjusted under 35 U.S.C. 154(b) by 1340 days.

(21) Appl. No.: 12/002,408

(22) Filed: Dec. 17, 2007

(65) Prior Publication Data

US 2009/0152408 A1 Jun. 18, 2009

(51) Int. Cl.
*F16L 3/00* (2006.01)
*B23P 11/00* (2006.01)

(52) U.S. Cl.
USPC .............................. 248/49; 29/432; 29/432.1

(58) Field of Classification Search
USPC ......................................................... 248/49
See application file for complete search history.

(56) References Cited

U.S. PATENT DOCUMENTS

| | | | | |
|---|---|---|---|---|
| 3,404,648 A | * | 10/1968 | Rosbottom | 413/14 |
| 3,981,064 A | * | 9/1976 | Hafner | 29/432 |
| 4,418,558 A | | 12/1983 | Simmons | |
| 4,531,279 A | * | 7/1985 | Gunter | 29/509 |
| D292,974 S | | 12/1987 | Kenning et al. | |
| 4,831,711 A | * | 5/1989 | Rapp | 29/509 |
| 4,897,912 A | * | 2/1990 | Slasinski | 29/432.2 |
| 5,230,136 A | * | 7/1993 | Cronn et al. | 29/521 |
| 5,432,989 A | * | 7/1995 | Turek | 29/243.5 |
| 5,517,743 A | * | 5/1996 | Liebig et al. | 29/521 |
| 5,580,014 A | | 12/1996 | Rinderer | |
| 2006/0243013 A1 | * | 11/2006 | Zdravkovic et al. | 72/3 |

OTHER PUBLICATIONS

BTM Corporation, Web site print outs from http://www.btmcorp.com/Catalogs/BTM_TL_UG.pdf for BTM's User's Guide for Tooling, pp. 1-7, visited Dec. 17, 2007, (7 pages).
BTM Corporation, Web site print outs from http://www.btmcorp.com/Catalogs/BTM_SEC_D.pdf for BTM Corporation Engineering Standards, pp. 38-41, visited Dec. 17, 2007, (4 pages).

* cited by examiner

*Primary Examiner* — Terrell McKinnon
*Assistant Examiner* — Christopher Garft
(74) *Attorney, Agent, or Firm* — J. Bennett Mullinax, LLC

(57) ABSTRACT

A cable tray is provided. The cable tray may include first and second side rails with a rung located therebetween. The rung may be attached to the first side rail by way of a first clinching connection. The rung may be attached to the second side rail by way of a second clinching connection. In accordance with other embodiments, first and second lancing connections may be used instead of or in addition to the clinching connections. A method of constructing a cable tray is also provided.

3 Claims, 3 Drawing Sheets

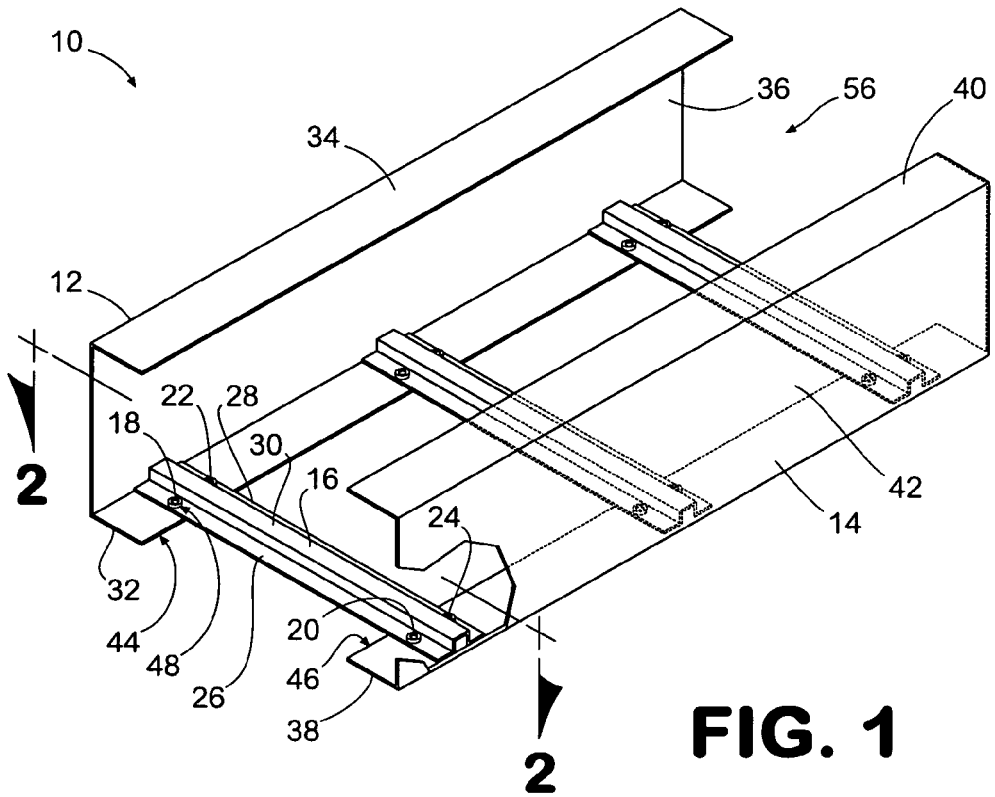
FIG. 1
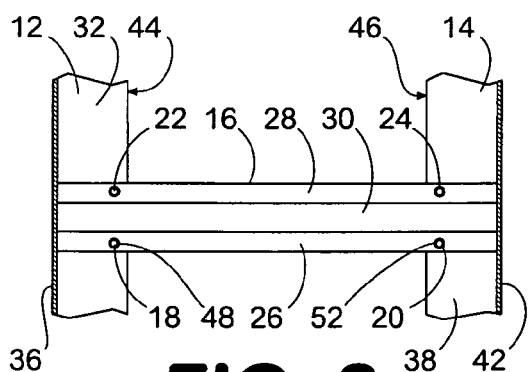
FIG. 2
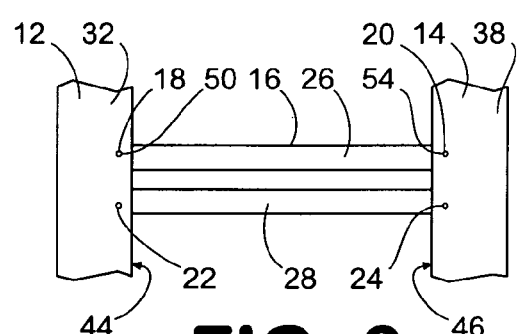
FIG. 3
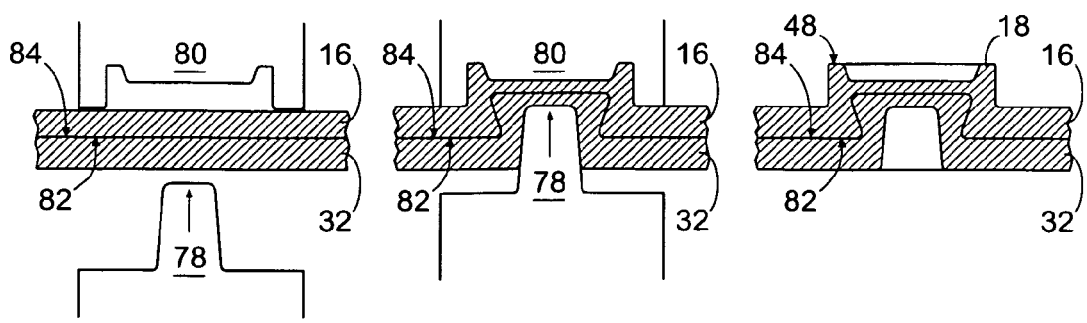
FIG. 4A  FIG. 4B  FIG. 4C

CABLE TRAY

FIELD OF THE INVENTION

The present invention relates generally to cable trays. More particularly, the present application involves a ladder-type cable tray that has rungs secured to side rails through a clinching or lancing process.

BACKGROUND

Cable trays are generally rigid structures used to support runs of cable. The cable tray can be suspended above the floor of a building or other structure to allow cable to be run from one desired place to another without interfering with people or machinery on the floor of the building. Cable trays may be arranged with a pair of side rails that run generally parallel to one another. A plurality of rungs can be attached to the side rails and may be spaced from one another at set intervals. The cable can lie atop the rungs and can be prevented from sliding off of either end of the rungs by the side rails. The rungs additionally function to tie the side rails together and provide structural support to the resulting assembly.

It is known in the manufacture of cable trays to attach the rungs to the side rails through the use of spot welding. This attachment technique generates sparks and fumes when being performed and requires equipment such as electrodes to be cooled once finished. Also, variations in the strength and integrity of the resulting attachment may occur due to variations in arc voltage, gas flow, and operating amperage when conducting spot welding. The welding tip may be required to be frequently cleaned, which results in slower production. Additionally, should the thickness or type of material being welded change, adjustments to certain parameters such as the welding voltage must be made. These adjustments can also result in a delay in formation of the cable tray. Although particular spot welds in cable trays may form a strong attachment, variation in the welding process may result in the failure of certain welds in the tray thus potentially causing a failure of the entire structure. As such, there remains room for variation and improvement within the art.

SUMMARY

Various features and advantages of the invention will be set forth in part in the following description, or may be obvious from the description, or may be learned from practice of the invention.

One aspect of one exemplary embodiment includes a cable tray that has a first side rail and a second side rail. The cable tray also includes a rung located between the first side rail and the second side rail. The rung may be attached to the first side rail by way of a first clinching connection. Further, the rung may be attached to the second side rail by way of a second clinching connection.

An additional aspect is provided in another exemplary embodiment that includes a cable tray with a first side rail and a second side rail. A rung is located between the first side rail and the second side rail. The rung may be attached to the first side rail by way of a first lancing connection. Additionally, the rung may be attached to the second side rail by way of a second lancing connection.

Another aspect of an additional exemplary embodiment is found in a method of constructing a cable tray. The method includes the step of providing a first side rail that has a portion with flat upper and lower surfaces. An additional step may be included in providing a rung that has a portion with flat upper and lower surfaces. An additional step may include positioning the first side rail and the rung against one another so that one of the flat upper and lower surfaces of the portion of the first side rail is contiguous with one of the flat upper and lower surfaces of the rung. An additional step may be included in deforming the contiguous surfaces of the first side rail and the rung so that a mechanical interlock is formed. The deforming step can be accomplished without the use of a heated element.

These and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which:

FIG. 1 is a perspective view of a cable tray with clinching connections in accordance with one exemplary embodiment.

FIG. 2 is a cross-sectional view taken along line 2-2 of FIG. 1.

FIG. 3 is a bottom view of the cable tray of FIG. 1.

FIGS. 4A-4C are cross-sectional views showing various stages of formation of a clinching connection in accordance with another exemplary embodiment.

Figure 5:
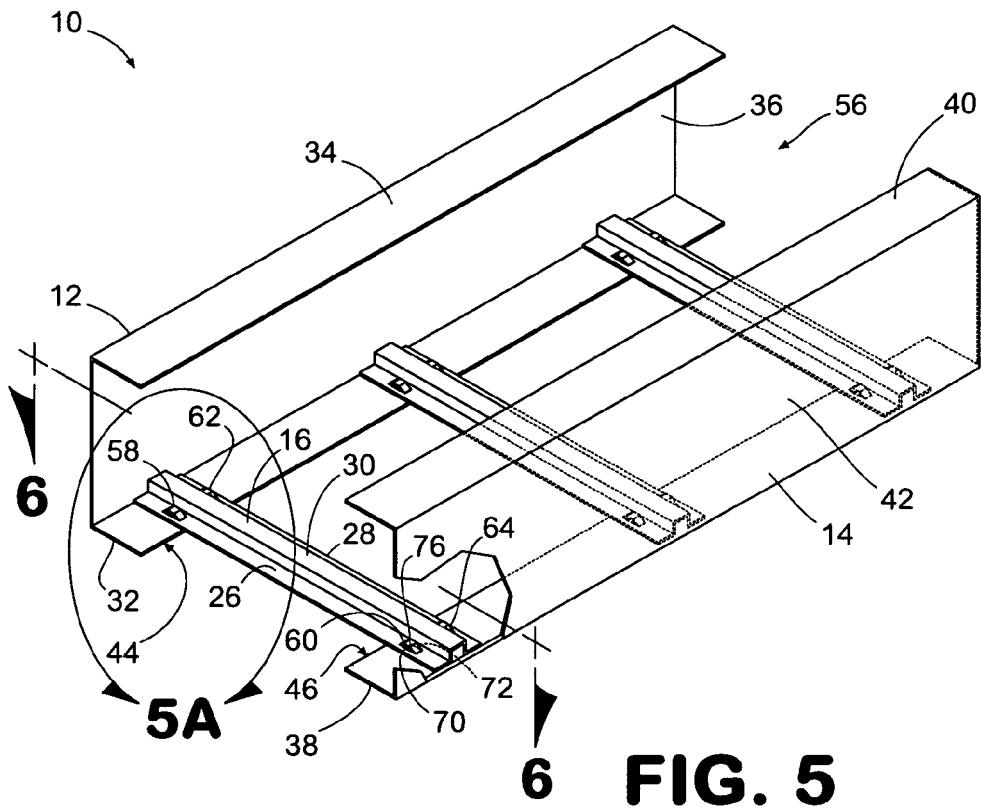
FIG. 5 is a perspective view of a cable tray with lancing connections in accordance with another exemplary embodiment.
Figure 5A:
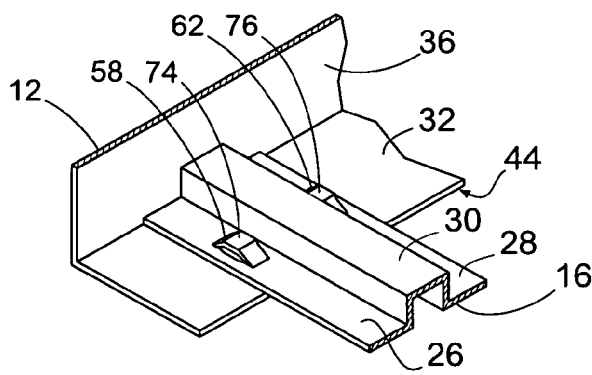
FIG. 5A is a cross-section view taken along line 5A of FIG. 5.

Repeat use of reference characters in the present specification and drawings is intended to represent the same or analogous features or elements of the invention.

DETAILED DESCRIPTION OF THE DRAWINGS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a cable tray 10 that may include a first side rail 12, a second side rail 14 and a rung 16. The first side rail 12 and rung may be attached through a first clinching connection 18. The second side rail 14 and rung 16 can be attached to one another through use of a second clinching connection 20. The first and second clinching connections 18 and 20 function to effect connection of the aforementioned components without impairing the aesthetics or functionality of coating present on or in the side rails 12, 14 and rung 16. Further, such connections can be made without the production of sparks or fumes and may be made relatively quickly. Additional embodiments are possible in which one or more of the attachments are lancing connections 58 that also function to tie together the side rails 12, 14 and rung 16. Multiple rungs 16 may be disposed along the length of the side rails 12, 14 and can be connected thereto by clinching connections 18 and/or lancing connections 58.

FIG. 1 is a perspective view of a cable tray 10 in accordance with one exemplary embodiment. The cable tray 10 includes first and second side rails 12 and 14 that are C-channels. However, it is to be understood that the first and second side rails 12 and 14 may employ other shapes in accordance with other exemplary embodiments. For example, the side rails 12 and 14 may be I-beams, box channels, solid members, or hollow cylinders in accordance with various exemplary embodiments. A number of rungs 16 are disposed along the length of the first and second side rails 12 and 14 at spaced intervals. The cable tray 10 defines a cable retention area 56 into which elements, such as cable and the like, may be retained. Although not shown, a number of support bars may be suspended from a ceiling or other structure and can be located below, and support, the side rails 12 and 14. The side rails 12, 14 can be attached to the support bars through the use of tie-down members (not shown) in order to create a secure resulting structure. However, it is to be understood that other arrangements of supporting the side rails 12, 14 and rungs 16 are possible. For example, the side rails 12, 14 and rungs 16 can be supported by posts from the ground, can rest on top of structures or surfaces, or can be suspended by cables that are attached directly to the side rails 12 and 14.

Rung 16 has a first flange 26 and a second flange 28 that have flat upper and lower surfaces. A cable supporting member 30 is present on the rung 16 and is integrally formed with the first flange 26 and second flange 28 such that the rung 16 is a single integral piece. The upper surface of the cable supporting member 30 is flat and functions to support cable (not shown) placed thereon when extending along the cable tray 10. The upper surfaces of the first flange 26 and second flange 28 lie in the same plane as one another that is parallel to the plane into which the upper surface of the cable supporting member 30 lies. The rung 16 is arranged into a shape sometimes referred to as hat-shaped. However, the rung 16 can be variously configured in accordance with other embodiments. For example, the rung 16 may be in the shape of a C-channel, an I-beam, a box beam, or a flat rectangular component. Additionally, the rung 16 need not be made of a single, integral piece in accordance with other embodiments but may be made of multiple components. Further, although shown as having the same configuration, the multiple rungs 16 need not be identically configured in other versions of the cable tray 10.

The first side rail 12 has a first horizontal flange 32 that has a flat upper surface. An integrally formed vertical member 36 extends from the first horizontal flange 32 to an integral second horizontal flange 34. The vertical member 36 has a flat surface that faces the cable retention area 56. The second horizontal flange 34 has a flat upper surface thus forming the first side rail 12 as a C-channel. An end of the rung 16 engages the flat surface of the vertical member 36 and is located flush against this surface such that it is engaged by the ends of the first flange 26, second flange 28 and the cable supporting member 30. This engagement prevents turning movement of the rung 16 with respect to the first side rail 12 since the end of the rung 16 is in flush engagement with the vertical member 36 of the first side rail 12.

The second side rail 14 is arranged in a similar manner to the first side rail 12. In this regard, the second side rail 14 includes a first horizontal flange 38 that has a flat upper surface that is integrally formed with a vertical member 42 that also has a flat surface that faces the cable retention area 56. The vertical member is also integrally formed with a second horizontal flange 40 of the second side rail 14. The second horizontal flange 40 has a flat upper surface such that the second side rail 14 assumes a C-channel shape. Although configured in a similar manner to the first side rail 12, it is to be understood that the first and second side rails 12, 14 can be shaped different than one another in other versions of the cable tray 10.

An end of the rung 16 engages the vertical member 42 of the second side rail 14. Here, the end of the first flange 26, second flange 28 and cable supporting member 30 contact the vertical member 42 in a flush engagement. This configuration functions, in addition to the engagement between the rung 16 and the first side rail 12 at the vertical member 36, to prevent rotational movement between the side rails 12, 14 and the rung 16. Further, although the rung 16 is shown as being disposed against both vertical members 36 and 42, it is to be understood that other arrangements are possible in which only one or neither of the ends of the rung 16 engage the vertical members 36 and/or 42.

The first flange 26 of the rung 16 is attached to the first horizontal flange 32 of the first side rail 12 by way of a first clinching connection 18. The first clinching connection 18 functions to connect the first side rail 12 and the rung 16 so that these components are at least partially fixed relative to one another. A second clinching connection 20 is present in the cable tray 10 and is located so as to attach the first horizontal flange 38 to the rung 16. The second clinching connection 20 also functions to at least partially fix the relative position of the rung 16 to the side rails 12 and 14. A third clinching connection 22 is also present and is located at the second horizontal flange 34 of the first side rail 12 and the second flange 28 of the rung 16. Additionally, a fourth clinching connection 24 is incorporated into the cable tray 10 and functions to attach the second horizontal flange 40 of the second side rail 14 to the second flange 28 of the rung 16. Although shown as incorporating four clinching connections, it is to be understood that any number may be used in accordance with various exemplary embodiments. For example, from one to ten clinching connections may be used to secure the rung 16 to the first side rail 12 and second side rail 14. Additionally, other attachment mechanisms or members may be used in combination with a clinching connection in accordance with other exemplary embodiments. For example, spot welding, mechanical fasteners, or adhesion may be used in addition with a clinching connection in order to secure the rung 16 to the side rails 12 and 14.

FIGS. 2 and 3 more clearly show the placement of the clinching connections 18, 20, 22 and 24 with respect to the side rails 12, 14 and the rung 16. The first clinching connection 18 and the third clinching connection 22 are located the same distance from an inner edge 44 of the first horizontal flange 32. This distance may be selected so that the clinching connections 18 and 22 are not weakened through being located too close to the inner edge 44. In accordance with other exemplary embodiments, the clinching connections 18 and 22 may be located at different distances from the inner edge 44. Such an arrangement may be advantageous in that it may discourage twisting or turning of the rung 16 with respect to the first side rail 12.

The second clinching connection 20 and the fourth clinching connection 24 are located the same distance away from an inner edge 46 of the first horizontal flange 38 of the second side rail 14. As previously discussed with respect to the first and third clinching connections 18 and 22, the second clinching connection 20 and the fourth clinching connection 24 can be located at different distances from the inner edge 46 in other embodiments. The first clinching connection 18 and the second clinching connection 20 may be located at the same distance from one another as the distance between the third clinching connection 22 and the fourth clinching connection 24. Other variations are possible in which the distance between the first and second clinching connections 18 and 20 is greater or less than the distance between the third and fourth clinching connections 22 and 24.

The first clinching connection 18 is formed so that a button 48 faces towards the cable retention area 56 of the cable tray 10. A button 52 of the second clinching connection 18 is similarly arranged. Punch cavities 50 and 54 of the first and second clinching connections 18 and 20 face away from the cable retention area 56. The buttons 48 and 52 are circular in shape and may have the same outer surface properties and look of the other portions of the rung 16 and side rails 12, 14. the punch cavities 50 and 54 have a circular inner surface as well and likewise can have the same surface characteristic as other proximate portions of the side rails 12, 14 and the rung 16. The third and fourth clinching connections 22 and 24 may be provided with buttons and punch cavities that are arranged in a similar manner as those previously discussed. Variations to the disclosed embodiment are also possible. For example, the button 48 may face the cable retention area 56 while button 52 faces away from the cable retention area 56 in accordance with other exemplary embodiments.

FIGS. 4A-4C illustrate an exemplary embodiment of a process of forming the clinching connections such as the first clinching connection 18. A flat portion 82 of the first horizontal flange 32 of the first side rail 12 is placed into engagement with a flat portion 84 of the rung 16. A die 80 is provided and is located vertically above a punch 78. The engaged first horizontal flange 32 and the rung 16 may be clamped between the punch 78 and the die 80. The punch 78 can be actuated so that it moves upwards into contact with the first horizontal flange 32 and the rung 16 thus drawing these components into the die 80 as shown in FIG. 4B. The die 80 may be arranged such that the first horizontal flange 32 and the rung 16 are formed into a permanent connection with one another. In this regard, the metal can be overlapped such that a dovetail connection is formed. The metals thus lock onto one another in the resulting connection. The first horizontal flange 32 of the first side rail is as thick or thicker than the first flange 26, which is the portion of the rung 16 that is clinched. However, other embodiments are possible in which this is not true. The metals are not cut in the clinching process. The punch 78 and die 80 can be variously arranged to plastically deform the metal into various mechanical interlocks. The first horizontal flange 32 and the rung 16 are not damaged in the process thus negating the need to repaint or further treat the formed connection. In this regard, the first horizontal flange 32 and the rung 16 may be painted and/or have a zinc coating that is not impaired or otherwise damaged by the clinching process.

The clinching process is a cold forming process and does not require the use of heated elements. Although shown as being a fixed cavity die 80, in other embodiments the die 80 can have moving portions that extend laterally when the metals are being squeezed inside of the die 80 to accommodate the lateral flow. Placement of the die 80 vertically above the punch 78 when clinching may allow for easier cleaning. In this regard, debris finding its way into the die 80 may fall via gravity out of the die 80 due to its inverted orientation. Further, the die 80 may be blown out or otherwise cleaned during the formation process. Various clinching arrangements may be employed in accordance with other exemplary embodiments. Certain clinching methods and tooling are disclosed and available from BTM Corporation having offices at 300 Davis Road, Marysville, Mich.

In practice, the side rails 12 and 14 can be positioned opposite from one another and a plurality of rungs 16 can be located at set intervals thereon. A movable punch 78 and die 80 can be automated along the length of the side rails 12 and 14 and may form clinching connections at desired, preset locations. Optionally, the clinching method may be performed through the use of hand held equipment by an operator.

A clinching connection, such as the first clinching connection 18 is not as strong of a connection as a properly formed spot weld between the rung 16 and one of the side rails 12 or 14. However, sufficient variation may exist in forming spot welds such that one or more of the spot welds along the length of cable tray 10 is improperly formed and thus a weak point. Applicant has discovered that the use of theoretically weaker clinching attachments in place of stronger spot welding attachments provides an unexpected result of a stronger overall cable tray 10 because of consistent formation of the clinching connections.

Figure 6:
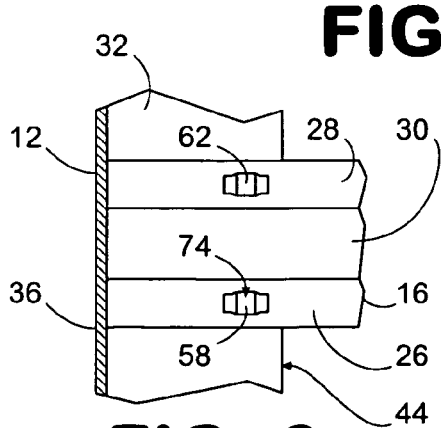
FIG. 6 is a cross-sectional view taken along line 6-6 of FIG. 5.
Figure 7:
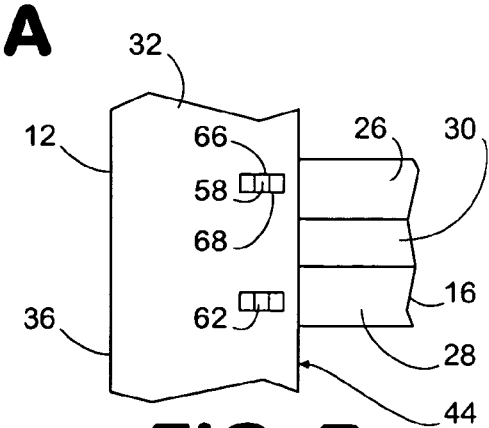
FIG. 7 is a bottom view of the cable tray of FIG. 5.

FIGS. 5-7 show another exemplary embodiment of the cable tray 10. The features of the cable tray 10 with the exception of the clinching connections 18, 20, 22 and 24 are the same as previously discussed with respect to the exemplary embodiment in FIGS. 1-3 and a repeat of this information is not necessary. Here, the clinching connections 18, 20, 22 and 24 are replaced with a first lancing connection 58, a second lancing connection 60, a third lancing connection 62 and a fourth lancing connection 64. The lancing connections 58, 60, 62 and 64 are formed differently than the clinching connections 18, 20, 22 and 24 with different features but perform the same function in attaching the rungs 16 to the first side rail 12 and the second side rail 14. The button 48 of the first lancing connection 58 has an upper surface 74 that is rectangular in shape. At least a portion of the punch cavity 50 of the first lancing connection 58 has a surface that is rectangular in shape. The button 48 faces the cable retention area 56 while the punch cavity 50 faces away from the cable retention area 56. Formation of the first lancing connection 58 results in the formation of a first shear edge 66 and a second shear edge 68. The shear edges 66 and 68 have straight portions and are parallel to one another. The shear edges 66 and 68 include the first horizontal flange 32 of the first side rail 12 and the first flange 26 of the rung 16.

The second lancing connection 60 may include features similar to the first lancing connection 58. In this regard, the second lancing connection 60 can have a button 52 that has an upper surface 76 that is rectangular in shape. A punch cavity 54 is also present that has a portion of an inner surface that likewise has a rectangular shape. As with the first lancing connection 60, the button 52 faces the cable retention area 56, and the punch cavity 54 faces away from the cable retention area 56. Formation of the second lancing connection 60 produces first and second shear edges 70 and 72 that have portions that are parallel to one another. The second lancing connection 60 is formed into the first horizontal flange 38 of the second side rail 14 and the first flange 26 of the rung 16. The third and fourth lancing connections 62 and 64 can be formed in a similar manner as the first and second lancing connections 58 and 60.

The process of forming the lancing connections 58, 60, 62 and 64 is different than the process of forming the clinching connections 18, 20, 22 and 24. However, other features not instrumental to the process of formation may be the same for the lancing connections 58, 60, 62 and 64 as those described above with respect to the clinching connections 18, 20, 2 and 24 and a repeat of this information is not necessary. However, as an example, the first lancing connection 58 and the third lancing connection 62 may be located the same distance away from the inner edge 44 of the first horizontal flange 32 of the first side rail 12 or may be located at the same distance from the inner edge 44 in the same manner as previously discussed with respect to the first and third clinching connections 18 and 22.

Figure 8A:
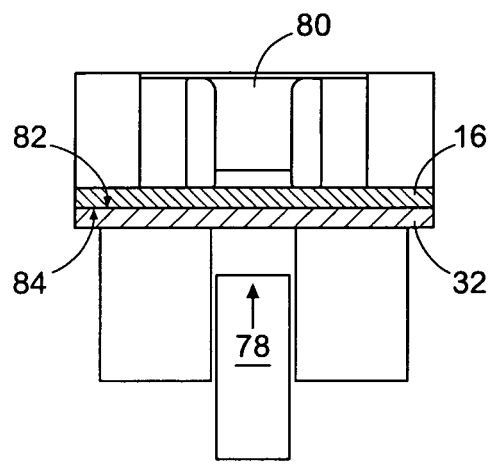
FIGS. 8A-8D are cross-sectional views showing various stages of formation of a lancing connection in accordance with another exemplary embodiment.
Figure 8B:
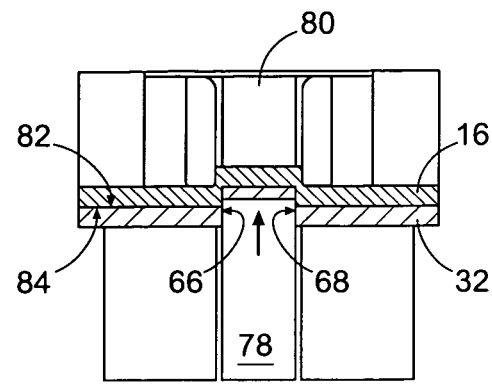
Figure 8C:
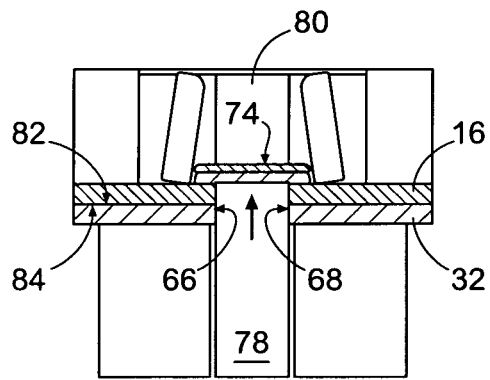
Figure 8D:
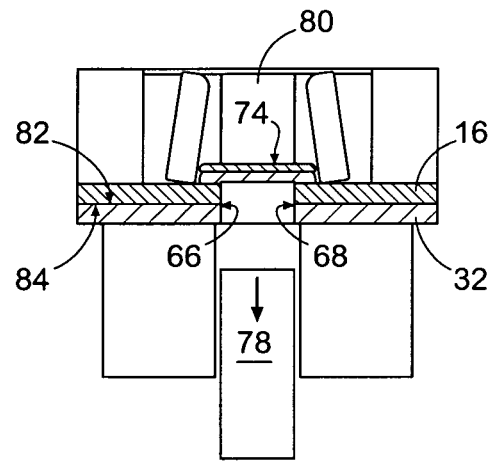
Figure 9:
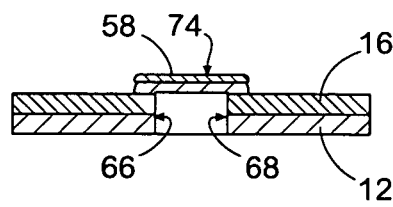
FIG. 9 is a cross-sectional view showing a lancing connection formed by the process of FIGS. 8A-8D.

An exemplary process of forming a lancing connection such as the first lancing connection 58 is illustrated in FIGS. 8A-8D. Here, flat portion 82 of the first horizontal flange 32 of the first side rail 12 and flat portion 84 of the first flange 26 of the rung 16 are engaged with one another. The first horizontal flange 32 and the first flange 26 can be clamped between the punch 78 and the die 80. As with the clinching process, the die 80 is located vertically above the punch 78. FIG. 8B shows actuation of the punch 78 so that metal is forced into the die 80. However, in this process, the punch 78 shears the first horizontal flange 32 and the first flange 26 so that a first shear edge 66 and a second shear edge 68 are formed. FIG. 8C shows the punch 78 advanced so that the metal in the die 80 is squeezed thus resulting it its flow laterally. The die 80 in this embodiment has movable portions to accommodate the lateral flow of material of the first horizontal flange 32 and the first flange 26. The ends opposite the sheared edges 66 and 68 are not cut such that a resulting interlock is formed between the first horizontal flange 32 and the first flange 26. The punch 78 can be retracted as shown in FIG. 8D so that the resulting lancing connection 58 is formed as illustrated in FIG. 9. The first horizontal flange 32 of the first side rail is as thick or thicker than the first flange 26. However, other embodiments are possible in which this is not true.

The punch 78 and die 80 can be variously arranged to plastically deform the metal into various mechanical interlocks. The painted or treated surfaces of the first horizontal flange 32 and the rung 16 are not damaged in the process thus negating the need to repaint or further treat the formed connection. In this regard, the first horizontal flange 32 and the rung 16 may be painted and/or have a zinc coating that is not impaired or otherwise damaged by the lancing process.

The lancing process is a cold forming process and does not require the use of heated elements. Although shown as having a die 80 with moving components, the die 80 can be a fixed cavity die 80 in accordance with other exemplary embodiments. Placement of the die 80 vertically above the punch 78 when clinching may allow for easier cleaning. In this regard, debris finding its way into the die 80 may fall via gravity out of the die 80 due to its inverted orientation. Further, the die 80 may be blown out or otherwise cleaned during the formation process. Various lancing arrangements may be employed in accordance with other exemplary embodiments. Certain lancing methods and tooling are disclosed and available from BTM Corporation having offices at 300 Davis Road, Marysville, Mich.

In practice, the side rails 12 and 14 can be positioned opposite from one another and a plurality of rungs 16 can be located at set intervals thereon. A movable punch 78 and die 80 can be automated along the length of the side rails 12 and 14 and may form lancing connections at desired, preset locations. Optionally, the lancing method may be performed through the use of hand held equipment by an operator.

A lancing connection, such as the first lancing connection 58 is not as strong of a connection as a properly formed spot weld between the rung 16 and one of the side rails 12 or 14. However, sufficient variation may exist in forming spot welds such that one or more of the spot welds along the length of cable tray 10 is improperly formed and thus a weak point. Applicant has discovered that the use of theoretically weaker lancing attachments in place of stronger spot welding attachments provides an unexpected result of a stronger overall cable tray 10 because of consistent formation of the lancing connections.

Although shown has having either lancing connections, or clinching connections, it is to be understood that other embodiments are possible in which both clinching and lancing connections are present in the cable tray 10. The clinching and lancing connections are both cold forming connections.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. A method of constructing a cable tray comprising the steps of:
   providing a first side rail that has a portion with flat upper and lower surfaces and the first side rail has a vertical member that has a first horizontal flange and a second horizontal flange disposed on opposite ends, wherein the first horizontal flange has the portion with flat upper and lower surfaces;
   providing second side rail that has a vertical member that has a first horizontal flange and a second horizontal flange disposed on opposite ends, wherein the first horizontal flange of the second side rail has a portion with flat upper and lower surfaces, wherein the first horizontal flange of the second side rail has an inner edge that faces an inner edge of the first horizontal flange of the first side rail, and wherein the second horizontal flange of the second side rail has an inner edge that faces an inner edge of the second horizontal flange of the first side rail;
   providing a rung that has a portion with flat upper and lower surfaces;
   positioning the first side rail and the rung against one another such that one of the flat upper and lower surfaces of the portion of the first side rail is contiguous with one of the flat upper and lower surfaces of the rung;
   positioning the second side rail and the rung against one another such that one of the flat upper and lower surfaces of the portion of the second side rail is contiguous with one of the flat upper and lower surfaces of the rung;
   deforming the contiguous surfaces of the first side rail and the rung such that a first mechanical interlock is formed at the portion with flat upper and lower surfaces of the first side rail and at the portion with flat upper and lower surfaces of the rung, wherein the deforming step is accomplished without the use of a heated element, deforming the contiguous surfaces of the second side rail and the rung such that a second mechanical interlock is formed, wherein the deforming step involving the second mechanical interlock is accomplished without the use of a heated element;

deforming the contiguous surfaces of the first side rail and the rung such that a third mechanical interlock is formed at a location that is at a different distance from the inner edge of the first horizontal flange of the first side rail than the location of the first mechanical interlock, wherein the deforming step involving the third mechanical interlock is accomplished without the use of a heated element; and deforming the contiguous surfaces of the second side rail and the rung, such that a fourth mechanical interlock is formed at a location that is at a different distance from the inner edge of the first horizontal flange of the second side rail than the location of the second mechanical interlock, wherein the deforming step involving the fourth mechanical interlock is accomplished without the use of a heated element, wherein the first, second, third, and fourth mechanical interlocks are located above the flat upper portions of the first horizontal flanges of the first and second side rails so as to be located in the interior of the cable tray.

2. The method as set forth in claim 1, wherein a punch and die are used in order to effect the deforming step, wherein the die is located vertically above the punch during the deforming step.

3. The method as set forth in claim 1, wherein the deforming step of the first side rail and the flange includes the creation of a circular button and a circular punch cavity, wherein the flat upper surface and the flat lower surface of the portion of the first side rail are not broken upon execution of the deforming step, wherein the flat upper surface and the flat lower surface of the portion of the rung are not broken upon execution of the deforming step.

* * * * *